US010157692B2

(12) United States Patent
Gill et al.

(10) Patent No.: US 10,157,692 B2
(45) Date of Patent: Dec. 18, 2018

(54) COLD ATOM INTERFEROMETRY

(71) Applicant: The Charles Stark Draper Laboratory, Inc., Cambridge, MA (US)

(72) Inventors: Alexander Gill, Medford, MA (US); Steven J. Byrnes, Watertown, MA (US); Jennifer Choy, Cambridge, MA (US); Christine Y. Wang, Boston, MA (US); Matthew A. Sinclair, Stoneham, MA (US); Adam Kelsey, Newton, MA (US); David Johnson, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/685,330

(22) Filed: Aug. 24, 2017

(65) Prior Publication Data
US 2017/0372808 A1 Dec. 28, 2017

Related U.S. Application Data

(63) Continuation-in-part of application No. 15/402,399, filed on Jan. 10, 2017, now Pat. No. 9,952,154.
(Continued)

(51) Int. Cl.
*G01B 9/02* (2006.01)
*G01N 21/64* (2006.01)
(Continued)

(52) U.S. Cl.
CPC ......... *G21K 1/006* (2013.01); *G01B 9/02015* (2013.01); *G21K 1/025* (2013.01); *G21K 1/067* (2013.01)

(58) Field of Classification Search
USPC ....... 250/251, 269.1, 526; 356/450, 451, 28, 356/28.5
See application file for complete search history.

(56) References Cited

U.S. PATENT DOCUMENTS 6,891,623 B1 5/2005 Baudon et al.
9,019,506 B1 4/2015 Black et al.
(Continued)

OTHER PUBLICATIONS

Barrett et al., "Mobile and remote inertial sensing with atom interferometers," *Societá Italiana di Fisica*, 63 pages (Aug. 13, 2014).
(Continued)

*Primary Examiner* — Bernard Souw
(74) *Attorney, Agent, or Firm* — Sunstein Kann Murphy & Timbers LLP

(57) ABSTRACT

Improvements to atom interferometers. An improved atom interferometer has a single polarization-preserving fiber, coupled for propagation of beams of two Raman frequencies, and a parallel displacement beamsplitter for separating the laser beams into respective free-space-propagating parallel beams traversing at least one ensemble of atoms. A reflector generates one or more beams counterpropagating through the ensemble of atoms. Other improvements include interposing a beam-splitting surface common to a plurality of parallel pairs of beams counterpropagating through the ensemble of atoms, generating interference fringes between reflections of the beams to generate a detector signal; and processing the detector signal to derive at least one of relative phase and relative alignment between respective pairs of the counterpropagating beams.

14 Claims, 10 Drawing Sheets

Related U.S. Application Data

(60) Provisional application No. 62/353,415, filed on Jun. 22, 2016.

(51) Int. Cl.
  G21K 1/02 (2006.01)
  G21K 1/00 (2006.01)
  G21K 1/06 (2006.01)

(56) References Cited

U.S. PATENT DOCUMENTS

| | | | |
|---|---|---|---|
| 9,134,250 B2 * | 9/2015 | Smirnov | B81C 1/00031 |
| 9,952,154 B2 * | 4/2018 | Sinclair | G01N 21/6404 |
| 2011/0101972 A1 | 5/2011 | Narducci et al. | |
| 2014/0022534 A1 | 1/2014 | Strabley et al. | |
| 2014/0190254 A1 * | 7/2014 | Bouyer | G01V 7/14 73/382 G |
| 2017/0307652 A1 * | 10/2017 | Compton | G01B 9/02003 |
| 2017/0370840 A1 * | 12/2017 | Sinclair | G01B 9/02015 |

OTHER PUBLICATIONS

Battelier et al., "Development of compact cold-atom sensors for inertial navigation," *Atom Phy.*, 17 pages (May 2016).

Canuel et al., "6 axis inertial sensor using cold-atom interferometry," *Phys. Rev. Lett*, vol. 97, 010402 (Jul. 2006).

Carter et al., "Risley Prisms: 125 Years of New Applications," *Eos*, vol. 87, No. 28, pp. 273, 276 (Jul. 2006).

Cronin et al., "Optics and interferometry with atoms and molecules," *Reviews of Modern Physics*, vol. 81, No. 3, pp. 1051-1129 (Jul.-Sep. 2009).

Erickson C.J., "Construction of a Calcium Matter-Wave Interferometer," *Brigham Young University*, Thesis, 96 pages (Nov. 2007).

Feng et al., "Single-polarization, switchable dual-wavelength erbium-doped fiber laser with two polarization-maintaining fiber Bragg gratings," *Opt. Exp.*, vol. 16, Issue No. 16, pp. 11830-11835 (2008).

Friebe et al., "Absolute frequency measurement of the magnesium intercombination transition $^1S_0 \rightarrow {}^3P_1$," 8 pages (Nov. 2007).

Gouët et al., "Limits to the sensitivity of a low noise compact atomic gravimeter," *Appl. Phy.*, vol. 92, Issue No. 2, pp. 133-144 (Aug. 2008).

McGuirk et al., "Sensitive Absolute Gravity Gradiometry Using Atom Interferometry," *Phy. Rev.* A, vol. 65, 25 pages (Feb. 2002).

Ménoret et al., "A transportable cold atom inertial sensor for space applications," *International Conference on Space Optics*, 7 pages (Oct. 2010).

Ménoret et al., "Dual-Wavelength Laser Source for Onboard Atom Interferometry," *Optics Letters*, vol. 36, Issue No. 21, pp. 4128-4130 (Nov. 2011).

Rakholia et al., "Dual-axis, high data-rate atom interferometer via cold ensemble exchange," *Phys. Rev. Appl.*, vol. 2, 054012 (2014).

Serrentino et al., "Sensitivity limits of a Raman atom interferometer as a gravity gradiometer," *Phys. Rev. A*, vol. 89, 023607 (2014).

Vangeleyn et al., "Single-laser, one beam, tetrahedral magneto-optical trap," *Optics Exp.*, vol. 17, Issue No. 16, pp. 13601-13608 (Aug. 2009).

Yver-Leduc et al., "Reaching the quantum noise limit in a high-sensitivity cold-atom inertial sensor," *J. Opt. B: Quantum Semiclass. Opt.*, vol. 5, pp. S136-S142 (2003).

Korean Intellectual Property Office, International Search Report—Application No. PCT/US2017/035727, dated Sep. 4, 2017, 11 pages, together with the Written Opinion of the International Searching Authority.

* cited by examiner

COLD ATOM INTERFEROMETRY

The present application is a continuation-in-part of U.S. Ser. No. 15/402,399, filed Jan. 10, 2017, and, through that application, claims the priority of U.S. Provisional Application Ser. No. 62/353,415, filed Jun. 22, 2016. Both of those applications are incorporated herein by reference.

STATEMENT REGARDING FEDERALLY SPONSORED RESEARCH OR DEVELOPMENT

This invention was made with government support under contract number FA8650-13-C-7325, awarded by the United States Air Force. The U.S. Government has certain rights in the invention.

TECHNICAL FIELD

The present invention relates to atomic interferometry, and, more particularly, to optical configurations that enable unprecedented precision and stability of atom interferometric measurements.

BACKGROUND ART

Some of the most precise measurements of physical quantities currently available derive from atom interferometry. These include limits on composition-dependent gravitational forces (Einstein's principle of equivalence), measurements of the ratio h/m in an atom, and derivative determinations of the fine structure constant. Measurements of such exquisite precision, as well as accelerometer and gyroscopic applications, require stability in the face of external factors such as temperature or pressure variations and other mechanical or optical perturbations.

Atom interferometry encompasses various classes of well-known techniques, and has been employed not only for fundamental measurements but for such practical applications as precision inertial sensing. Atom interferometry is based on tracking the center-of-mass motion of an ensemble of atoms by generating matter wave interference and measuring its phase shift. The matter wave interference may be created by applying light pulses that interact with the atoms via two-photon Raman transitions. Critical components of an atom interferometer include a source of atoms (thermal or cooled) in a vacuum chamber, a defined trajectory, and counter-propagating Raman beams that, along with the trajectory, define the inertially sensitive axes. As the term is used herein, an axis shall be designated "inertially sensitive" if motion about or along the axis by the atom interferometer results in a detectable interferometer signal.

Depending on its configuration, an atom interferometer may be operated as an accelerometer, a gyroscope, or a combined accelerometer-gyroscope. In either of the latter two gyroscopic cases, a baseline set by launching the atoms at a finite velocity (typically on the order of m/s to hundreds of m/s) is necessary to provide rotational sensitivity. (Various publications treat the sensitivity-limiting parameters of an atom interferometer. Examples include Canuel et al., "*Six-axis inertial sensor using cold-atom interferometry,*" *Phys. Rev. Lett.*, vol. 97, 010402 (2006)) where sensitivity was considered limited by the cold atom sources, and Sorrentino et al., "Sensitivity limits of a Raman atom interferometer as a gravity gradiometer," *Physical review A*, vol. 89 (2014), and Yver-Leduc et al. "*Reaching the quantum noise limit in a high-sensitivity cold-atom inertial sensor,*" *Journal of Optics B: Quantum and Semiclassical Optics*, vol. 5, p. 5136 (2003), all of which are incorporated herein by reference. A cold atom interferometer for navigation applications was also recently addressed by Battelier et al., "*Development of compact cold-atom sensors for inertial navigation,*" *arXiv preprint arXiv:*1605.02454 (2016) (hereinafter, Battelier 2016), incorporated herein by reference.

Since both accelerometer and gyroscope sensitivities scale quadratically with the time between interactions with the Raman pulses, there is a fundamental trade-off between sensitivity and sensor volume and bandwidth. In any practical configuration, external factors bearing on the relative optical phase of successive laser beams impinging on a probed ensemble of atoms give rise to measurement perturbations and drift, ultimately limiting system sensitivity. Thus, a configuration that, by its nature, provides for long-term stability of the relative phase of counterpropagating probe beams is particularly valuable. Such a configuration is taught for the first time herein.

Magneto-optical traps (MOTs) are widely used as sources of cold, dense clouds of atoms, and, recently, of simple molecules as well. Double traps are used to generate cold atomic ensembles swapped between the traps and interrogated interferometrically during transit between the traps. Such a system is described, for example, by Rakholia et al., "*Dual-axis high data-rate atom interferometer via cold ensemble exchange,*" *Phys. Rev. Appl.*, vol. 2, 054012 (2014) (hereinafter, Rakholia 2014), which is incorporated herein by reference.

For practical applications in inertial navigation systems (such as gimbaled and, especially, strapdown platforms), it is desirable for the atom interferometer to have a long-term stability that exceeds the performance of state-of-the-art classical sensors. Additionally, the instrument needs to be portable, orientation-insensitive, and be operated to meet its sensitivity and short-term noise requirements, while minimizing the "dead time" associated with generating the atom source (e.g. loading atoms into magneto-optical traps) and the sampling time (set by time between Raman pulses).

Mechanically rigid geometries that have been employed in single-trap designs do not lend themselves to double-trap implementation. The design of single MOTs employing micromirrors etched into monolithic structures, for example, has been driven largely by the goal of miniaturization and achieving a trap on a chip. Micromirrors etched into a pyramid, for example, have been used to achieve a tetrahedral four beam MOT, as described by Vangeleyn et al., "*Single-laser, one-beam, tetrahedral magneto-optical trap,*" *Opt. Exp.*, vol. 17, pp. 13601-08 (2009), which is incorporated herein by reference.

The proximity of two MOTs in such configurations does not allow for implementation of integral micromirror geometries as discussed above with respect to single traps. Typically, the proximity of the two MOTs, dictated by achievable magnetic field gradients, has been on the order of 20-50 mm. Therefore, dual MOT sensors have exclusively employed discrete beam-splitting and beam-turning optics deployed at a substantial distance from the traps. Performance of sensors based on two-trap MOTs may be limited by the stability of the respective traps. Consequently, a novel physical mechanism for ensuring the anti-symmetry of the MOTs, differing only in the sign of the wavevector of the launched atoms, while not limited by the structural rigidity of a supporting base, is highly desirable.

Some steps addressing various of these limitations have already been suggested in the prior art. First, the dead time in the atomic measurement associated with generating the atom source can be reduced by running two reciprocal cold atom interferometers in a "launch-catch" configuration and recapturing the atoms (at rates up to ~100 Hz) in between measurement cycles, as in Rakholia 2014. In that configuration, inertial sensitivity can be enhanced by applying Raman pules using physically separated Raman beams which extend the gyroscope baseline. However, that increases the complexity of distributing the Raman beams and maintaining phase stability.

The overall dead time in the inertial measurement can be effectively eliminated by operating the atomic sensor in closed loop with classical sensors that are co-mounted on the same moving platform (as in Battelier 2016, for example). Finally, orientation-insensitivity under acceleration can be reduced by using counter-propagating Raman beams with identical effective k-vectors oriented perpendicular to the axis of launch. This requires a Raman geometry in which the two Raman frequency components are incident from opposite sides of the cell containing the ensemble of atoms rather than a geometry in which both components together pass through the cell and retro-reflect back through it.

Propagation of beams of distinct wavelengths in orthogonal propagation modes of polarization-maintaining optical waveguide (such as optical fiber) has been the basis of various devices as described, for example, by Feng et al., "*Single-Polarization, Switchable Dual-Wavelength Erbium-Doped Fiber Laser with Two Polarization-Maintaining Fiber Bragg Gratings,*" Optics Express, vol. 16, pp. 11830-11835 (2008), which is incorporated herein by reference. Additionally, papers such as Ménoret et al., "*A transportable cold atom inertial sensor for space applications,*" *International Conference on Space Optics*, October 2010, Rhodes, Greece. pp. 1-4, (2010), and Ménoret et al., "*Dual-Wavelength Laser Source for Onboard Atom Interferometry,*" Opt. Lett., vol. 36, pp. 4128-4130 (2011), both incorporated herein by reference, teach the use of separate wavelengths generated within a fiber laser. However, two-trap atom interferometers have heretofore required that Raman beams of distinct wavelength be delivered separately because of the complexity entailed in combining and separating disparate wavelengths to multiple traps.

SUMMARY OF EMBODIMENTS OF THE INVENTION

In accordance with embodiments of the present invention, an improvement is provided to measurement methods that have steps of trapping an ensemble of atoms and measuring interference fringes between populations of internal states of a quantum system based on interaction of the ensemble of atoms with a plurality of counterpropagating optical beam pairs. The improvement entails steps of:

coupling the plurality of counterpropagating beam pairs such that each pair of beams traverses the ensemble of atoms in parallel counterpropagating beam paths;

interposing a beam-splitting surface common to the plurality of counterpropagating beam pairs;

generating interference fringes between reflections of the plurality of parallel pairs of counterpropagating beams to generate a detector signal; and processing the detector signal to derive at least one of relative phase and relative alignment between respective pairs of the counterpropagating beams.

In accordance with further embodiments of the present invention, processing the detector signal includes inferring relative alignment of the parallel pairs of counterpropagating beams from a depth of the interference fringes. Processing the detector signal may also include measuring phase shear across the plurality of parallel pairs of counterpropagating beams.

In other embodiments of the present invention, detecting the interference fringes may include spatially resolving the interference fringes using a detector array. The methods may also include a step of feeding back the at least one of relative phase and relative alignment between respective pairs of the counterpropagating beams to an optical element for stabilizing the at least one of relative phase and relative alignment between respective pairs of the counterpropagating beams.

In accordance with another aspect of the present invention, an atom interferometer is provided that has an ensemble of atoms successively launched between a pair of magneto-optical traps and a plurality of pairs of counterpropagating laser beams traverse the ensemble of atoms for probing quantum states characterizing the atoms. The atom interferometer also has a beam-splitting surface, common to the plurality of counterpropagating beam pairs, configured to reflect a portion of each of plurality of counterpropagating beam pair and a reflector for redirecting one of each pair of counterpropagating laser beams to form an interference pattern with the other of each pair of counterpropagating laser beams. A detector is configured to detect the interference pattern and generate a detector signal, and a processor is provided for receiving the detector signal and deriving a measure of at least of relative phase and relative spatial alignment of each pair of counterpropagating laser beams.

In an alternate embodiment of the invention, the detector for detecting the interference fringes includes a detector array.

In accordance with another aspect of the invention, an improvement is provided to an atom interferometer having at least one distinct ensemble of atoms. The improvement has a single polarization-preserving fiber coupled for propagation of a first laser beam characterized by a first Raman frequency and a second laser beam characterized by a second Raman frequency distinct from the first Raman frequency, from at least one source of the first and second laser beams. The improvement also provides a first parallel displacement beamsplitter for separating the first laser beam and the second laser beam coupled out of the polarization-preserving fiber into respective free-space-propagating parallel beams each respective free-space-propagating parallel beam traversing the at least one distinct ensemble of atoms.

In further embodiments of the invention, there may be a reflector for turning the second laser beam into a direction antiparallel to the first laser beam, and the reflector may be a corner cube reflector. The improvement may also provide a second parallel displacement beamsplitter for creating a plurality of counterpropagating laser beam pairs.

In accordance with yet another aspect of the invention, an atom interferometer is provided that has an ensemble of atoms successively launched between a pair of magneto-optical traps. The atom interferometer has a first plurality of laser beams, all characterized by a first Raman frequency, traversing the ensemble of atoms in a first set of parallel directions for probing quantum states characterizing the ensemble of atoms. It also has a second plurality of laser beams, all characterized by a second Raman frequency, traversing the ensemble of atoms in a second set of parallel directions substantially counterpropagating with respect to the first set of parallel directions. A first fiber collimator couples the first laser beam from optical fiber to free-space propagation substantially parallel to a baseplate and a first parallel displacement beam splitter splits the first laser beam into a plurality of parallel beam paths. A second fiber collimator couples the second laser beam from optical fiber to free-space propagation substantially parallel to the baseplate and a beam-turning optic steers the second laser beam in a path substantially parallel to the baseplate and substantially parallel to the plurality of parallel beam paths traversed by the first laser beam. A reflector is provided for turning the second laser beam into a direction substantially antiparallel to the plurality of parallel beam paths traversed by the first laser beam, while a second parallel displacement beam splitter splits the second laser beam into a plurality of parallel beam paths each counterpropagating on the plurality of parallel beam paths traversed by the first laser beam. In sime embodiments of the invention, the reflector may be a corner cube reflector.

In accordance with a yet further aspect of the present invention, an improvement is provided to an atom interferometer of the sort having a first and a second MOT displaced with respect to each other by an inter-trap distance bisected by a center displaced from either MOT by a "center-to-trap distance," with substantially orthogonal blue-detuned cooling beams traversing a first MOT in directions substantially opposing directions in which another pair of substantially orthogonal blue-detuned cooling beams traverse a second MOT, and substantially orthogonal red-detuned cooling beams traversing the first MOT in directions substantially opposing directions in which another pair of substantially orthogonal red-detuned cooling beams traverse the second MOT. The improvement has a first fiber collimator for coupling a first laser beam from optical fiber to free-space propagation in a first laser direction substantially parallel to a baseplate and displaced from the center by the center-to-trap distance and a second fiber collimator for coupling a second laser beam from optical fiber to free-space propagation substantially parallel to the baseplate, substantially orthogonal to the first laser direction, and also displaced from the center by the center-to-trap distance. The improvement also has a first pentaprism, disposed entirely within a sphere of radius no greater than three times the inter-trap distance about the center, for splitting the first laser beam into two orthogonal cooling beams, and a second pentaprism, disposed entirely within the sphere of radius no greater than three times the inter-trap distance about the center, for splitting the second laser beam into two orthogonal cooling beams.

Additionally, in accordance with other embodiments, the improvement may also have a third pentaprism, disposed entirely within the sphere of radius no greater than three times the inter-trap distance about the center, for further splitting the first laser beam into two orthogonal cooling beams, and a fourth pentaprism, disposed entirely within the sphere of radius no greater than three times the inter-trap distance about the center, for further splitting the second laser beam into two orthogonal cooling beams.

BRIEF DESCRIPTION OF THE DRAWINGS

The invention will be more fully understood by referring to the following Detailed Description of Specific Embodiments in conjunction with the Drawings, of which:

FIG. 3A is a perspective view of a single sensor relative to an optical baseplate, in accordance with an embodiment of the present invention, while

DETAILED DESCRIPTION OF SPECIFIC EMBODIMENTS

Definitions

The following terms shall be given the indicated meanings unless the context dictates otherwise. As the term is used herein and in any appended claims, the term "propagation axis" shall designate the axis that includes a ray that constitutes the centroid of directions characterizing momenta of particles in a beam.

The term "laser beam" shall refer to any output of a laser, irrespective of its degree of collimation.

"Rayleigh range" is the distance along the propagation axis of a beam from the waist to the place where the area of the cross section is doubled.

Novel concepts now described, may advantageously provide long-term stability and improved portability of an atom interferometer. The long-term stability of an atom interferometer depends on the intensity, polarization, frequency, and phase stability of the light fields, and the pointing stability of the optical beams. These optical stabilities may be advantageously improved in accordance with embodiments of the present invention, applicable in equal measure to systems using thermal beams or launched 2D MOTs, although systems employing MOTs in a reciprocal launch-catch configuration will be described here for heuristic convenience.

Figure 1:
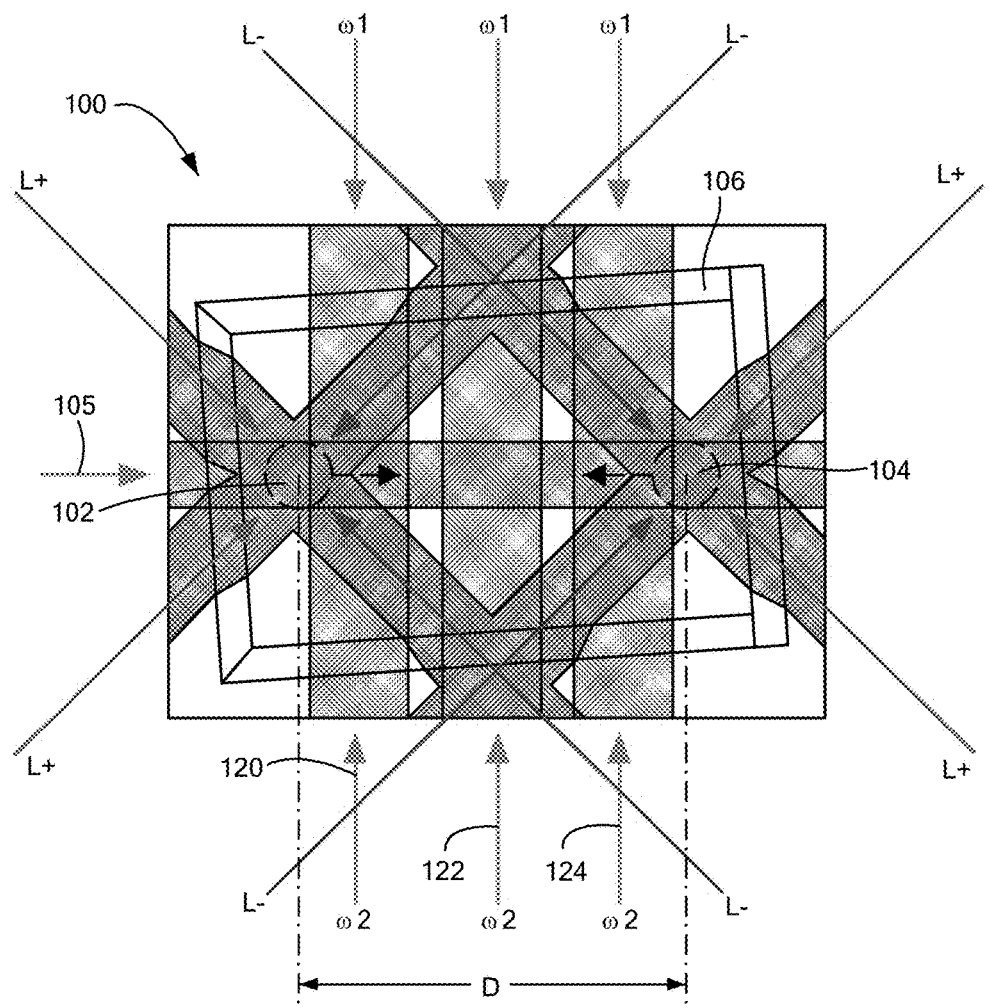
FIG. 1 is a schematic cross-section showing traversal of a vacuum cell by beams pertinent to a two-trap atom interferometer in accordance with an embodiment of the present invention.

In accordance with a preferred embodiment of the present invention, a cold atom accelerometer-gyroscope, designated generally by numeral 100 in the schematic cross-sectional depiction of FIG. 1, uses a pair of simultaneous atom-interferometers operating in a reciprocal "launch-catch" configuration.

The physics of atom interferometry is well-known and need not be described here. The reader is referred to such tutorial monographs as P. R. Berman, ed., *Atom Interferometry* (Academic Press, 1997) and Barrett et al., "*Mobile and remote inertial sensing with atom interferometers,*" arXiv preprint arXiv:1311.7033 (2013), and Rakholia 2014, cited above, all of which are incorporated herein by reference. Typically, stimulated Raman transitions between hyperfine atomic levels in a $\pi/2$-$\pi$--$\pi/2$ pulse sequence serve to coherently separate, redirect, and recombine atomic wavepackets from a cold atomic sample by imprinting a spatially-dependent phase of the light field on the atoms during each pulse. To first order, the resulting phase difference between the hyperfine levels is given by $$\Delta\phi = k_e \cdot (a - 2v \times \Omega)T^2,$$

where $k_e$ is the effective Raman wavevector, T is the delay between pulses, and v, a, and $\Omega$ are the velocity, acceleration, and rotation vectors of the atoms relative to the platform, respectively. $\Delta\phi$ provides acceleration and rotation, since the atomic physics dictate $k_e$.

Referring now to FIG. 1, the atom sources are a pair of magneto-optical traps (MOTs) 102, 104, formed within a common ultra-high vacuum cell (hereinafter, the "cell" or the "vacuum cell") 106, each constitituting laser cooled and trapped sources of Cs atoms, which, after a brief static loading period, are launched towards each other by oppositely detuning the optical frequencies of the transverse cooling beams (L+ and L−, also referred to herein as "MOT beams") to generate a moving molasses. MOTs 102 and 104, indicated in FIG. 1 by circles with arrows indicating launch direction, may be referred to herein, respectively, as MOT0 and MOT1. (MOT beams L0 are oriented out of the page and are not shown in FIG. 1, but are evident in FIG. 7A.) While operation with ensembles of cesium atoms is described herein, the invention described herein is not limited to cesium atoms and encompasses the use of any atoms.

At the beginning of each measurement cycle, the atoms launched in the previous cycle are recaptured at the opposite MOT site. A cross section of the beam diagram through the cell 106 is shown. The overall size of the sensor head is driven by the size of this cell. This, in turn, is driven by MOT separation D and beam size requirements. MOT separation distance D may also be referred to herein as an "intertrap distance." Greater MOT separations allow for a longer gyroscope baseline and sensitivity. Larger cell clear apertures allow for an improved detection signal-to-noise ratio (SNR) by allowing for larger MOT beam sizes, thereby improving trapping and recapture efficiency.

Figure 2:
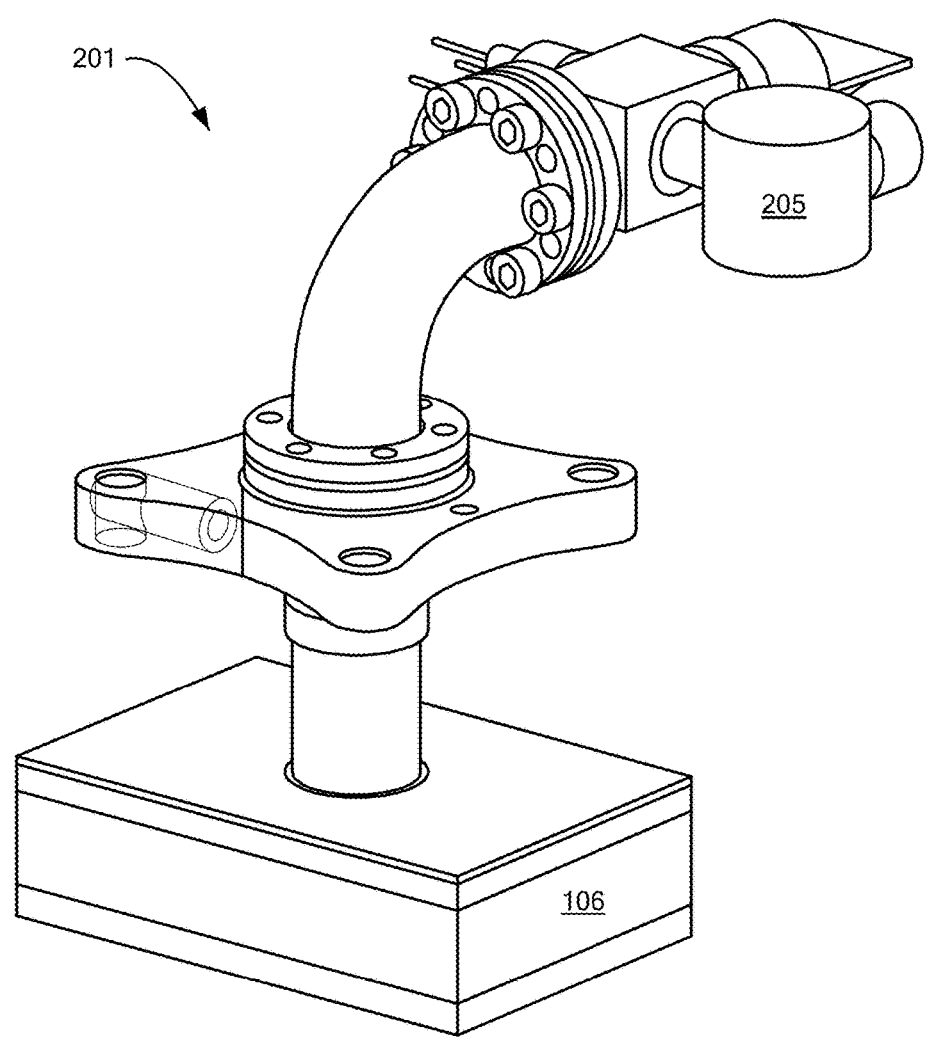
FIG. 2 is a perspective view showing detail of the vacuum cell of an atom interferometer in accordance with an embodiment of the present invention.
Figure 3A:
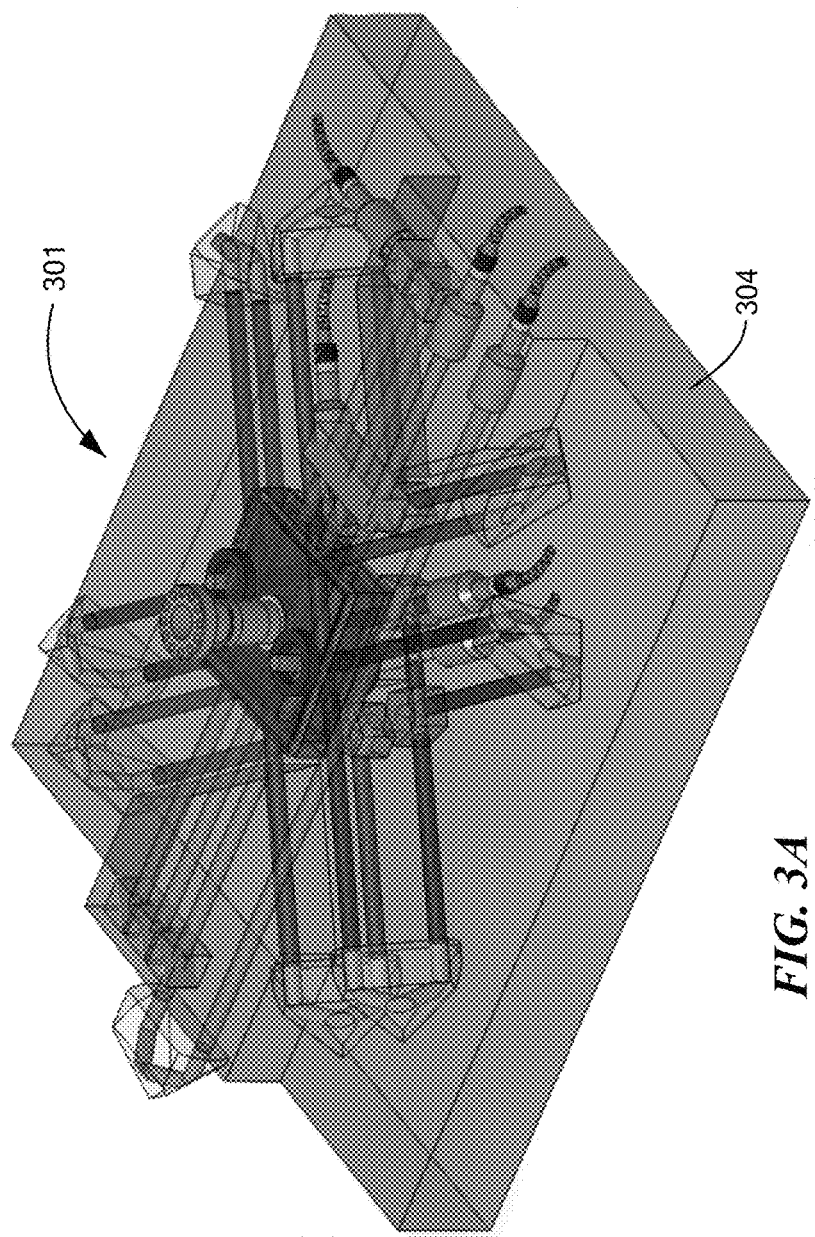
Figure 3B:
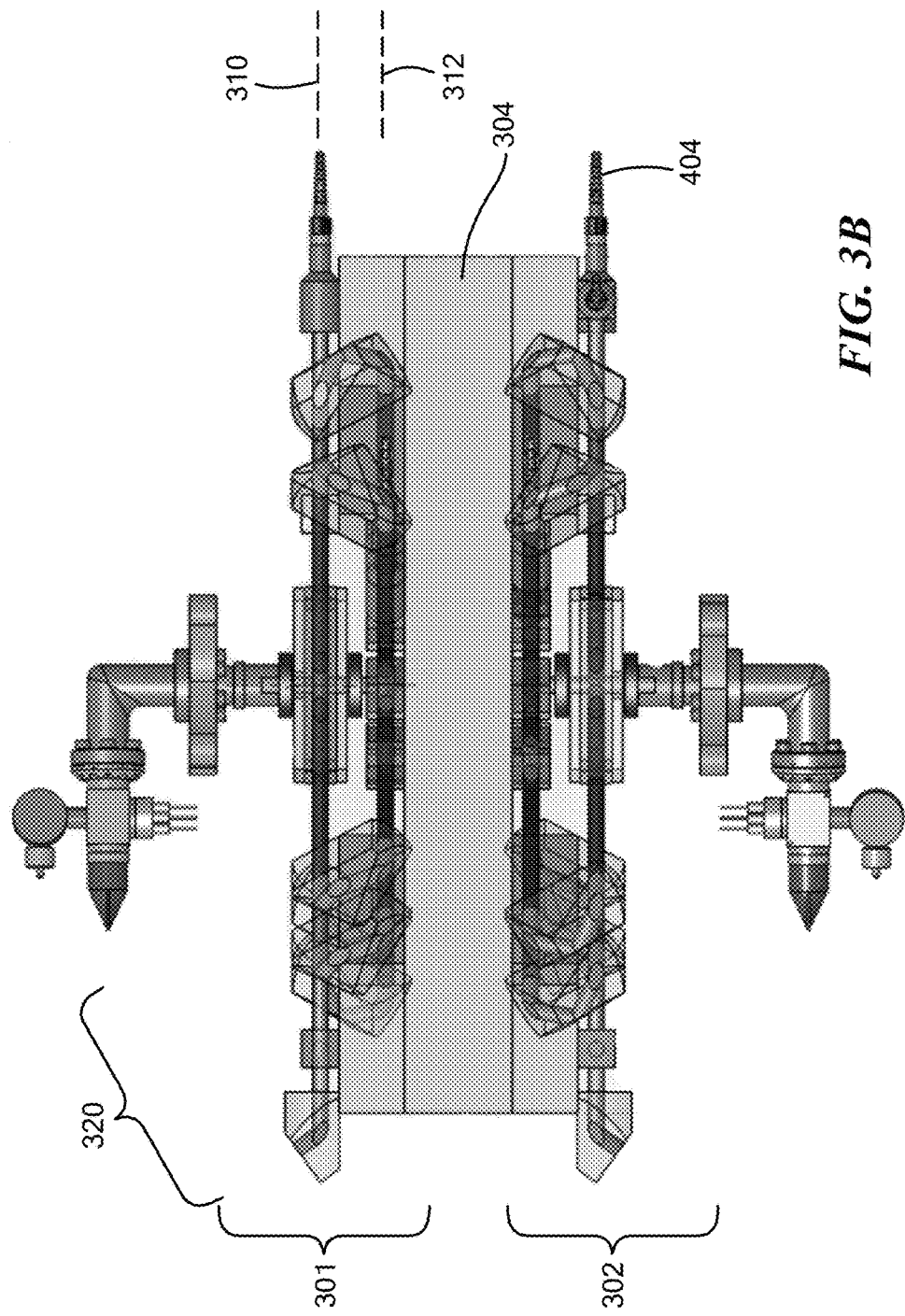
FIG. 3B shows two sensor heads, each of the kind shown in FIG. 3A, mounted on either side of the baseplate, in accordance with another embodiment of the present invention.

Laser beams at Raman frequencies ω1 and ω2, which may be referred to herein as Raman beams, traverse an ensemble of atoms in cell 106 in counterpropagating directions. Large Raman beams are also required for high atom interferometer contrast and improved orientation insensitivity. Cell 106 depicted in FIG. 2 is coupled to vacuum system 201, which may include ion pump 205. The MOT separation D (shown in FIG. 1) is on the order of 60 mm, while and three parallel Raman beams 120, 122 and 124 are spaced by approximately 20 mm. A cell clear aperture of 15 mm allows 7.5-mm-diameter Raman and MOT beams (typically defined in terms of a $e^{-2}$ diameter) to pass through the cell 106 with negligible wavefront distortion. Optical components, designated generally by numeral 320 in FIG. 3B, are all disposed outside vacuum cell 106. It is to be understood that the some or all of the sense head optical components may also be disposed within vacuum cell 106 within the scope of the present invention. For example, it could be especially beneficial to have the Michelson interferometer optics 600 (shown in FIG. 6 and described below) inside vacuum cell 106 in order to monitor the phase profile of the Raman light exactly as seen by the atoms and to remove spurious phase fluctuations caused by motion of the cell windows (not shown).

An embodiment of the present invention is now described with reference to Figs. FIGS. 1, 2, 3A, 3B and 4. FIG. 3B shows a cross-sectional view of an embodiment in which two sensor heads 301 and 302 are mounted on either side of a monolithic baseplate 304, though, in other embodiments, only a single sensor head (otherwise referred to herein as a "sensor") 301 need be provided. Sensor 301 may be seen more clearly in the perspective view of FIG. 3A. Monolithic basesplate 304 may be referred to herein as a "baseplate," "optical baseplate," "optical bench" or "bench." Baseplate 304 may be about 20 inches in diameter, or smaller, within the scope of the present invention, and still allow for adequate beam diameters. A compact form factor for sensor 301 is preferred and may be achieved by using a two-layered optical design now described with reference to FIG. 3B.

Referring to FIG. 3B, cell 106 is located on a top layer 310 near the center of the baseplate 304 and is suspended from above. The Raman beams 120, 122 and 124, state preparation and repump beams 105 are also on the top layer 310 in plane with the cell. The MOT beams L+, L− begin on the bottom layer 312 where they are routed and split into multiple components near the center of the baseplate 304 before being routed up to the top layer 312 and into the cell 106. The design shown in FIG. 3B, while densely packed, does not sacrifice access to the beams. Each beam has at least one area where it can be accessed from above for fine-tuning of optical alignment and polarization (by adjustment of Risley prism pairs, waveplates, etc.) before it enters the cell 106.

An additional advantage of having all the optics for a single sensor 301 mounted on one side of the optical baseplate 304 is that it enables the use of the opposite side of the baseplate for another function. Our prototype is actually a pair of independent sensors with identical sensor heads oriented back-to-back on a single baseplate (see Figure: Two sensors (variation 1) in a back-to-back configuration on a single baseplate). This serves the purpose of validating the sensor stability, as both sensors experience the same common inertial input. Another option would be to have a pair of sensors on one baseplate with inertial sensitivity along different axes. Alternatively, the opposite side of the sensor baseplate could be used to house some portion of the laser system used to generate and feed light to the sensor head (such as the system-critical Raman laser system).

Materials used for the sensor baseplate 304 and optics 320 are selected based on stability requirements as a matter of design choice. Disposition of optics 320 as describe below reduces dependence of the interferometer phase stability on the absolute stability of the baseplate 304 or optics mounting materials. Maintainance of interferometrically precise beam alignment in a laboratory environment using aluminum for the base material has been demonstrated, while other materials, including those that are more stable but difficult to manufacture (e.g., Zerodur®, beryllium, etc.) may be used for certain applications, within the scope of the present invention, to such portions of sensor 301 where the sensitivity is greatest, such as at the location of fiber collimators 401, 402 (shown in FIG. 4).

For purposes of describing the present invention, it is assumed that all laser beams are supplied to the sensor head 301 via single mode polarization maintaining optical fiber 330 (shown in FIG. 3B). All laser sources (otherwise referred to herein as "sources"), optical switches, and modulators employed in are contained in one or more separate modules (or "laser modules") 406, as known to persons of ordinary skill in the art. This has the advantage of modularity, i.e., separating the sensor head 301 and the laser modules according to logical function. Beams characterized by the same or distinct frequency may be derived from identical or multiple sources, within the scope of the present invention.

The use of optical fiber 330 for coupling between module 406 and sensor head 301 also offers the advantage of cleaning the spatial mode of each beam before it reaches the sensor head, and it advantageously decouples the sensor head from mechanical instability upstream of the fiber. Assuming adequate stripping of fiber cladding modes, all pointing drift upstream of the fiber is converted by the fiber to intensity drift. A polarizer (or "cleanup polarizer") 410 may be used at the output of each fiber 330 to clean the polarization state, thus converting any polarization drift upstream of the fiber to intensity drift. For all beams with a critical intensity stability requirement (particularly the Raman and cooling/launch beams), optical power is measured after cleanup polarizer 410 using a monitor detector (more particularly, a photodiode) 418, and stabilized by servoing back to a transducer (such as by RF attenuation of an accoustooptic modulator (AOM), not shown) located within laser module 406.

One disadvantage of using optical fiber 330 to deliver light to the sensor head 301 is that each separate fiber is an additional source of phase drift and polarization drift, where the polarization drift becomes intensity drift after the cleanup polarizer 410. This drift introduces noise by fluctuations in thermal and mechanical stress on the fiber 330 caused by the environment. Even with active intensity stabilization, it is advantageous to limit these sources of non-common mode noise by using as few fibers as possible. In accordance with an embodiment of the present invention, a single delivery fiber 330 is employed for all common beams required by the sensor head. These beams are stabilized as needed, by feedback of intensity after polarizer cleanup, as described above, after the fiber 330 and before being split and routed via free-space optics within the sensor head 301 to their destinations at the vacuum cell 106. In particular, two polarizations of a single polarization preserving fiber 330 may be employed to deliver beams of distinct frequencies $\omega_1$ and $\omega_2$, in accordance with the present invention. A preferred embodiment of the invention uses a total of seven fibers per sensor to deliver the following beams: Raman frequency components $\omega_1$ and $\omega_2$, MOT L0, L+, and L− (3 beams), state preparation (optical pumping) beam 105, and hyperfine repump beam (not shown). The repump beam may optionally be supplied mixed with the MOT light in the L0 fiber (not shown), in which case these frequency components are then dichroically split again after the fiber for intensity monitoring.

Measures have been described for mitigating the effects of beam misalignment and intensity and polarization drift upstream of the sensor head 301. Additionally, the atom interferometer phase is susceptible to differential phase noise introduced by fibers guiding the Raman frequency components $\omega_1$ and $\omega_2$. In accordance with an embodiment of the present invention, differential phase noise is mitigated this by monitoring the differential phase of the two Raman components within the sensor head 301 using Michelson interferometry, as described below. In accordance with another embodiment of the present invention, differential phase between Raman frequency components $\omega_1$ and $\omega_2$ is mitigated by carrying both Raman beams in cross-polarized propagation modes of a single fiber and splitting them within the sensor head 310. Even in this case, the Michelson interferometer 600 may advantageously be employed for monitoring differential phase or for actively stabilizing other sources of differential phase noise upstream of the fiber (such as within the Raman laser source module 406). Michelson interferometer 600 is described in detail below. Fiber phase noise is typically not a concern for the other laser systems.

All methods for routing the various beams from their fiber collimators to the cell are left as matters of design choice and are within the scope of the present invention. The designs of FIGS. 1-4 depicted herein are provided solely as examples.

Figure 4:
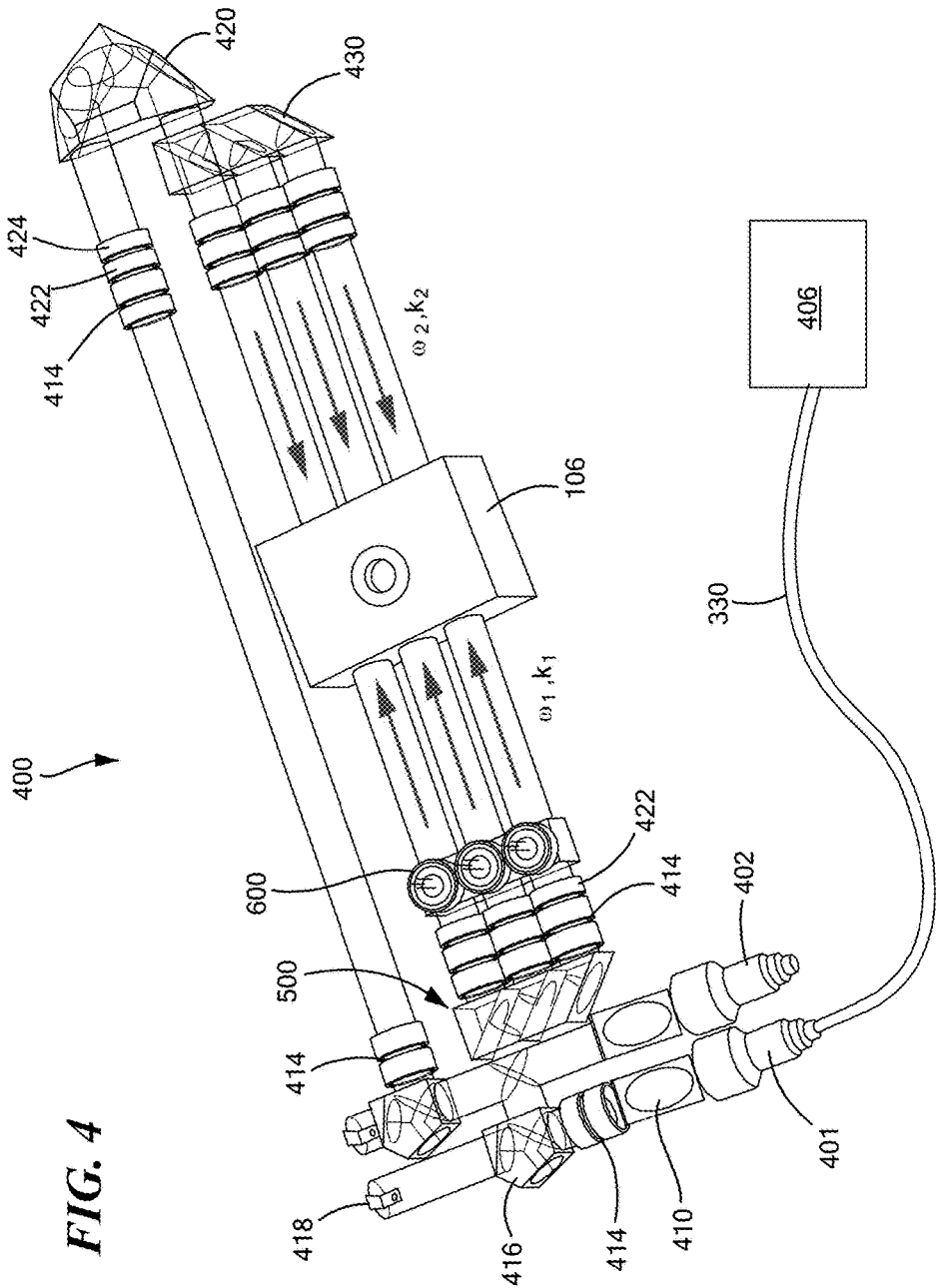
FIG. 4 is a schematic view of the layout of Raman beams in a two-trap atom interferometer in accordance with an embodiment of the present invention.

Layout of a Raman beam system (or "Raman optical system") 400, in accordance with an embodiment of the present invention, is now described with reference to FIG. 4. The setup shown in FIG. 4 advantageously produces three highly parallel $\omega_1$ beams counter-propagating with respect to three $\omega_2$ beams. In order not to limit system sensitivity, Raman beams $\omega_1$ and $\omega_2$ must meet specified alignment requirements such as:

parallelism of neighboring beams, i.e., the three $\omega_1$ beams and the three $\omega_2$ beams, typically on the order of less than 20 gad;
  parallelism of counter-propagating beams, typically on the order of less than 500 gad.

Additionally, it is desirable that wavefront distortion of Raman beams $\omega_1$ and $\omega_2$ be optically minimized in order to reduce variations in the phase observed by the atoms, especially when they are subject to cross-axis acceleration.

In order to generate beams that are parallel with high stability, optical components are preferred for which the beam deflection angle is relatively insensitive to disturbances in the position and orientation of the optical component. Some of these components, such as the parallel displacement beamsplitters and corner-cube reflector, generate output beams that are parallel (or anti-parallel) to their input and are highly desensitized to angular motion of the optic relative to the input beam (they are insensitive to rotation of the optic about any axis). Others include the penta prism, which is insensitive to rotations of the optic within the plane of incidence (but more sensitive in the other direction), and Risley prism pairs which can generate arbitrary deflection angles that are relatively insensitive to the tip and tilt of the prisms. In cases where a corner-cube reflector is used, it is to be ensured that the effective region of the optic does not intersect with the edges or vertex of the cube, a circumstance that would degrade polarization and beam quality.

For parallelism stability of counter-propagating beams, both Raman and MOT beams, sensor 301 is most susceptible to differential fluctuations between the angular orientations of the two fiber collimators 401 and 402. Such differential fluctuations may be advantageously reduced by co-locating the two fiber launch points (the loci of fiber collimators 401 and 402) on the optical bench 304. Penta prisms 416 are not necessary in all embodiments of the present invention, however they allow the footprint to be slightly reduced by bending the beams to one side. In an alternate embodiment of the invention, penta prisms are not employed but, instead, the beams are launched out of fiber 330 in a direction parallel to the propagation direction through cell 106. Penta prisms 416 may double as beamsplitters that direct a small amount of light to a monitor detector 418 for intensity monitoring and control. Flat beam pick-off optics might also be employed for that purpose. The use of a corner-cube 420 on the opposite side of the bench 304 (distal to fiber 330) to reflect Raman beam $\omega_2$ back towards $\omega_1$ introduces essentially no additional pointing error, regardless of the deformation of the bench 304. A second parallel displacement beamsplitter 430 splits the $\omega_2$ beam into three parallel beams, counterpropagating with respect to their $\omega_1$ beam counterparts.

The angular stability of the three parallel Raman beams ($\omega 1$ or $\omega 2$) incident from either side of the cell 106 is governed by the stability of lateral displacement beamsplitters 500 (shown in FIG. 4) and Risley prism pairs 414, if used. (Lateral displacement beamsplitter 500 is depicted in detail in FIG. 5.) For this reason it is of paramount importance to mount the prisms in a way that minimizes internal stress on the optic, even at the expense of absolute mechanical stability. For example, soft, flexible urethane adhesive may be employed. Optics are mechanically retained on the surface of the baseplate using soft spring pressure from above. Three raised pads on the bench below provide the mechanical contact. The soft adhesive bonds the optic to the bench between these pads. Circular optics such as fiber collimators, Risley prisms, and wave plates are housed in V-grooves on the bench surface and retained with spring pressure and adhesive.

Figure 5:
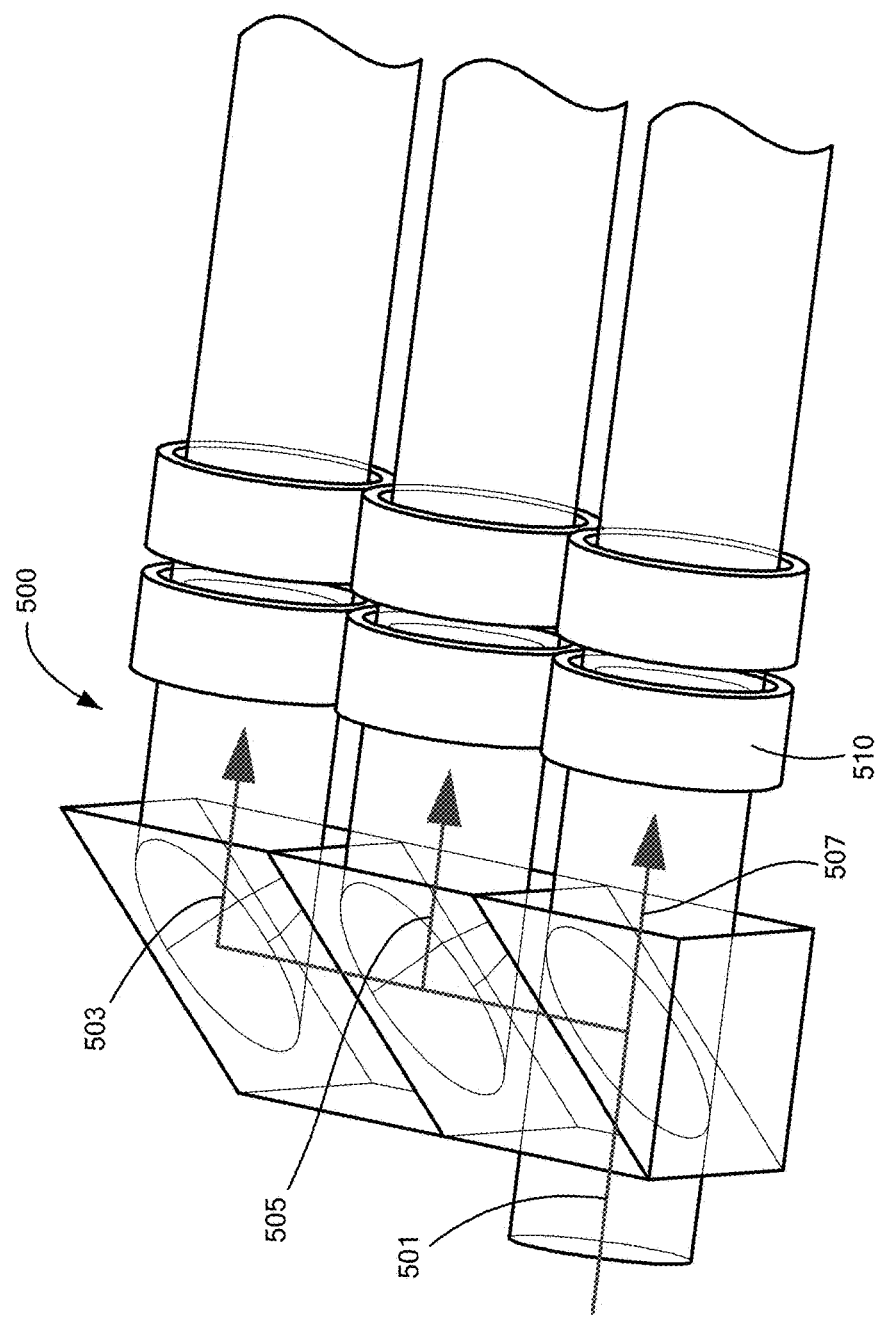
FIG. 5 shows detail of a lateral displacement beam splitter in accordance with an embodiment of the present invention.

As shown in FIG. 5, lateral displacement beamsplitter 500 splits incoming beam 501 into multiple, substantially parallel beams 503, 505 and 507. Any deviation from parallelism may be corrected by alignment of Risley prism pair 510.

In accordance with principles of the present invention described herein, effects of platform deformation and optical mounting instabilities on the final beam parallelism are reduced. This allows for the use of less expensive and more machinable materials for baseplates and optical mounts than would otherwise be needed, thus, for example, aluminum might be used for both. Furthermore, optical components can be manufactured with such tight angular surface tolerances that for some applications it is possible to forgo active alignment of the beams entirely. In particular, lateral displacement beamsplitters of the type shown in FIG. 5, with output beams parallel to within 20 gad, can be manufactured using standard methods. Similarly, corner cube retroreflectors with angular beam deviations under 20 gad are readily achievable. Risley prism pairs can be used for fine-tuning of the optical alignment where needed.

It is to be appreciated that while the optics described above generate deflection angles that are desensitized to rotations and displacements, the absolute lateral displacement of the beam through each optic is still fully sensitive to these motions. However, because the Raman system has no strict requirement for microscopic stability of beam centroid positions (side-to-side motions of the beams that are small with respect to the 7.5-mm beam size are acceptable), we are the possibility of lateral drifts resulting from platform instability is tolerable.

The use of large Raman beams has the obvious advantage of providing more uniform illumination of the atoms in flight. This leads to improved phase stability under dynamics (especially under cross-axis acceleration) and higher phase contrast at finite temperature. Optically, the use of large beams simplifies the optical layout by reducing the need for additional lenses to position the beam waists at the atoms. In a preferred embodiment of the invention, $1/e^2$ beam diameters are 7.5 mm, leading to a Rayleigh range of over 50 m—much larger than the scale of the apparatus. This reduces the dependence of wavefront curvature on optical path length near cell 106, reducing the need for precise path length matching of all beams. All optical surfaces after the collimators are planar, thus avoiding any angular beam tilts that would result from lateral motion of powered (nonplanar) optics. All optics must be specified to have sufficient clear aperture to prevent appreciable wavefront ripple due to diffraction effects.

In a preferred embodiment of the invention, clear apertures of 15 mm or greater are used for the Raman optics. It is unusual to find off-the-shelf polarizers that have this large a clear aperture and that also exhibit exceptional surface quality and polarization extinction ratio. One solution for this problem is to use specially coated Brewster's angle plate polarizers which are easy to manufacture with high flatness and arbitrarily large clear aperture and only require a single custom coating. We also note that a pair of waveplates (half-wave 422 and quarter-wave 424) are used in front of the corner-cube 420 to correct polarization errors.

Michelson interferometer 600 (shown in FIG. 4, and in detail in FIG. 6) is a subcomponent of the Raman optical system 400 that is used to monitor the relative phase stability between $\omega 1$ and $\omega 2$ as well as the spatial variation in the Raman beam wavefronts. The detected optical phase can also be stabilized by feeding back to a variable phase delay component (such as a piezo-mounted mirror). This utilization of a Michelson interferometer for phase detection and/or stabilization in close proximity to the atoms is equally useful for a variety of possible Raman beam configurations, including atom interferometer systems having 1, 2 or more fibers for Raman beam delivery and systems having retro-reflected Raman beams.

Figure 6:
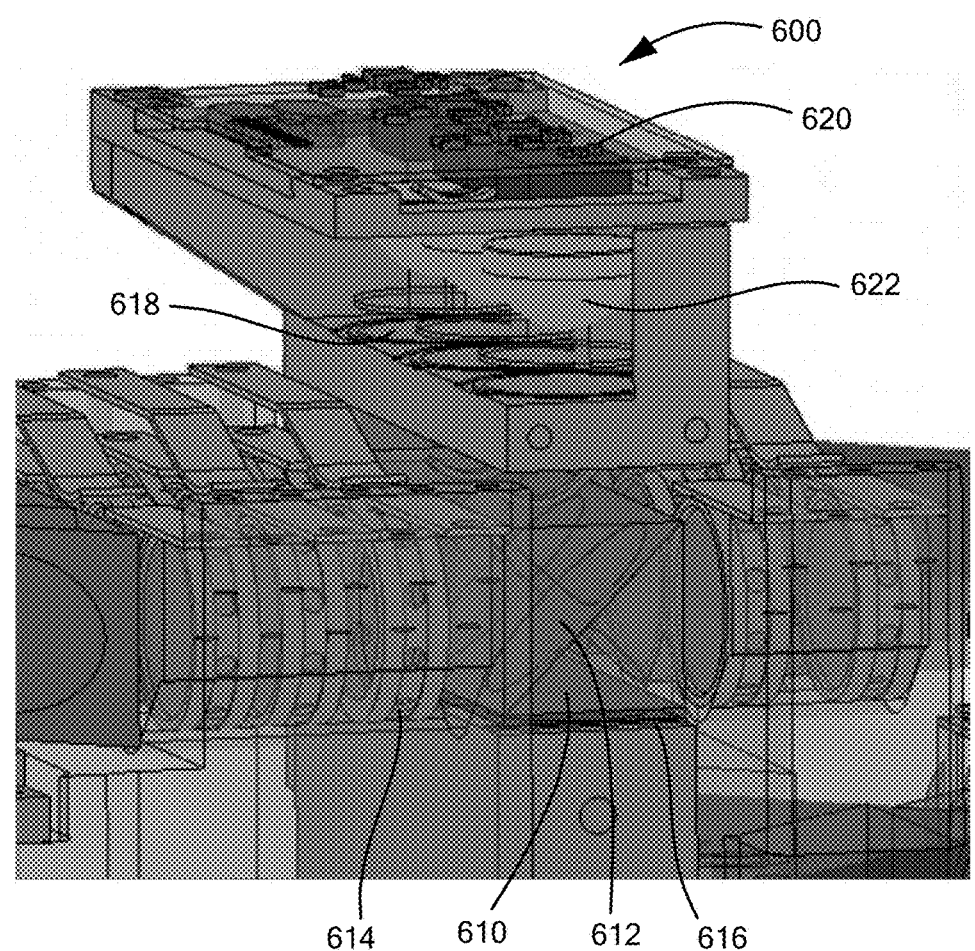
FIG. 6 shows a Michelson interferometer applied to multiple instances of counterpropagating beams, in accordance with an embodiment of the present invention.

For the Michelson detector optic 610, a single bonded optical component is employed, which includes a beamsplitter prism (or "beamsplitter surface") 612, quarter wave plate 614, and retro-reflecting mirror surface (or "retro-reflecting surface") 616 that extends across all three counter-propagating beam pairs (all shown in FIG. 6). All surfaces are preferably manufactured to exceptional surface regularity (<20 gad angle deviation between all beams). Polarizers 618 are rotated to fine tune the mixing of the two frequency components on the detectors 620 and compensate for any differences in relative beam power between the neighboring beams. The types of detectors 620 used depend upon the application. CCD cameras or other detector arrays may be used to monitor the fringes for initial alignment of the Raman system and characterization of the Raman optics. In some embodiments, three single photodiodes may be employed to measure the phase of each beam pair during the Raman pulses. Multi-pixel detectors (such as quad detectors or megapixel arrays) may be employed for in-situ monitoring of the spatial phase profile and phase shear across the beams, within the scope of the present invention. An added benefit of using a megapixel, or other large array, camera in the design is the use of this camera to detect the positions and sizes of the atom clouds in transit across the Raman beams. This information can be used to compensate for errors imprinted in the atomic phase that result from variations in the atom trapping location, trajectory, and spatial distribution.

The measured optical phase is susceptible to relative motion between the beamsplitter surface 612 and the retro-reflecting surface 616. This would introduce drift in the phase measurement if these two surfaces belonged to separate optics. By combining these surfaces in a single prism joined together by optical contact bonds, the susceptibility of the measured phase difference to deformations of the baseplate or optical mounts is advantageously reduced. Furthermore, by specifying a fixed uniform angle of 45 degrees between these surfaces, the need for manual alignment of the two surfaces is eliminated. Angular alignment of the optic relative to the beams still needs to be mechanically stable to maximize contrast, but in principle all the information to determine relative beam parallelism and phase is still there even if the optic experiences a tilt error. Image capture and processing may be employed to extract this information if multiple fringes are visible. The absolute mechanical stability of the Michelson phase detection optics (polarizers, lenses 622, detectors 620) is not critical, because these optics appear downstream of the beamsplitting surface where interference occurs.

Figure 7A:
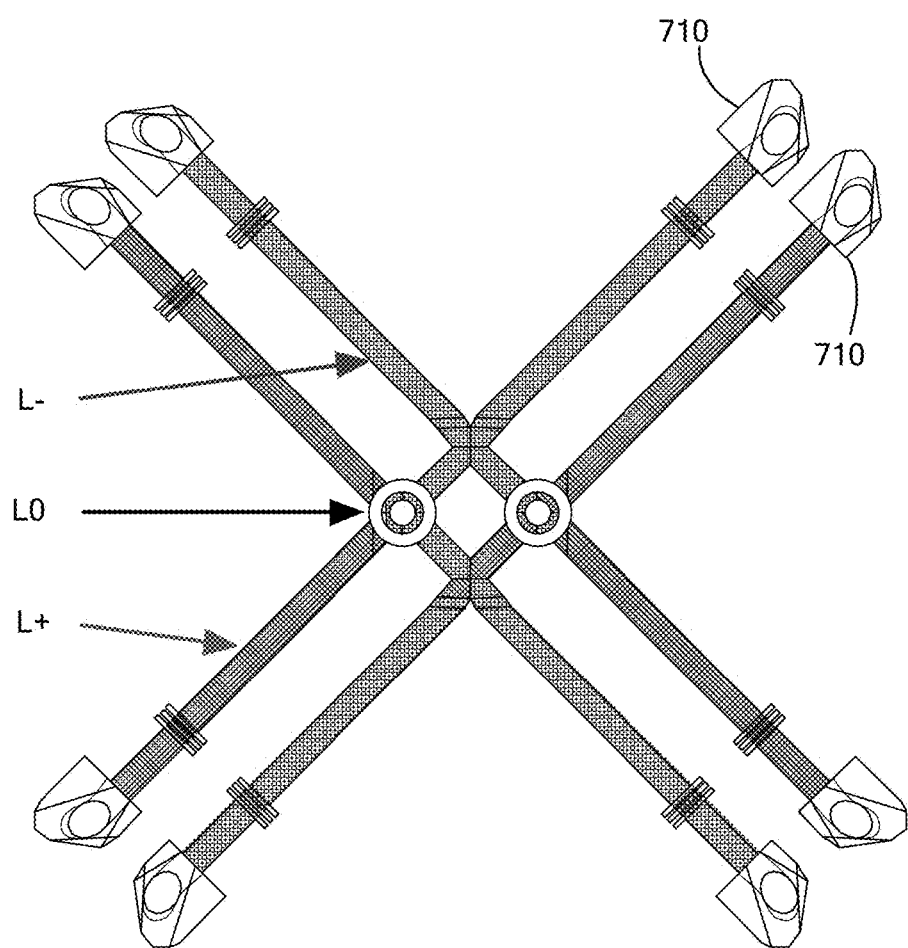
FIGS. 7A and 7B shows the top layer and general layout of the MOT beams of a two-trap atom interferometer in accordance with an embodiment of the present invention.
Figure 7B:
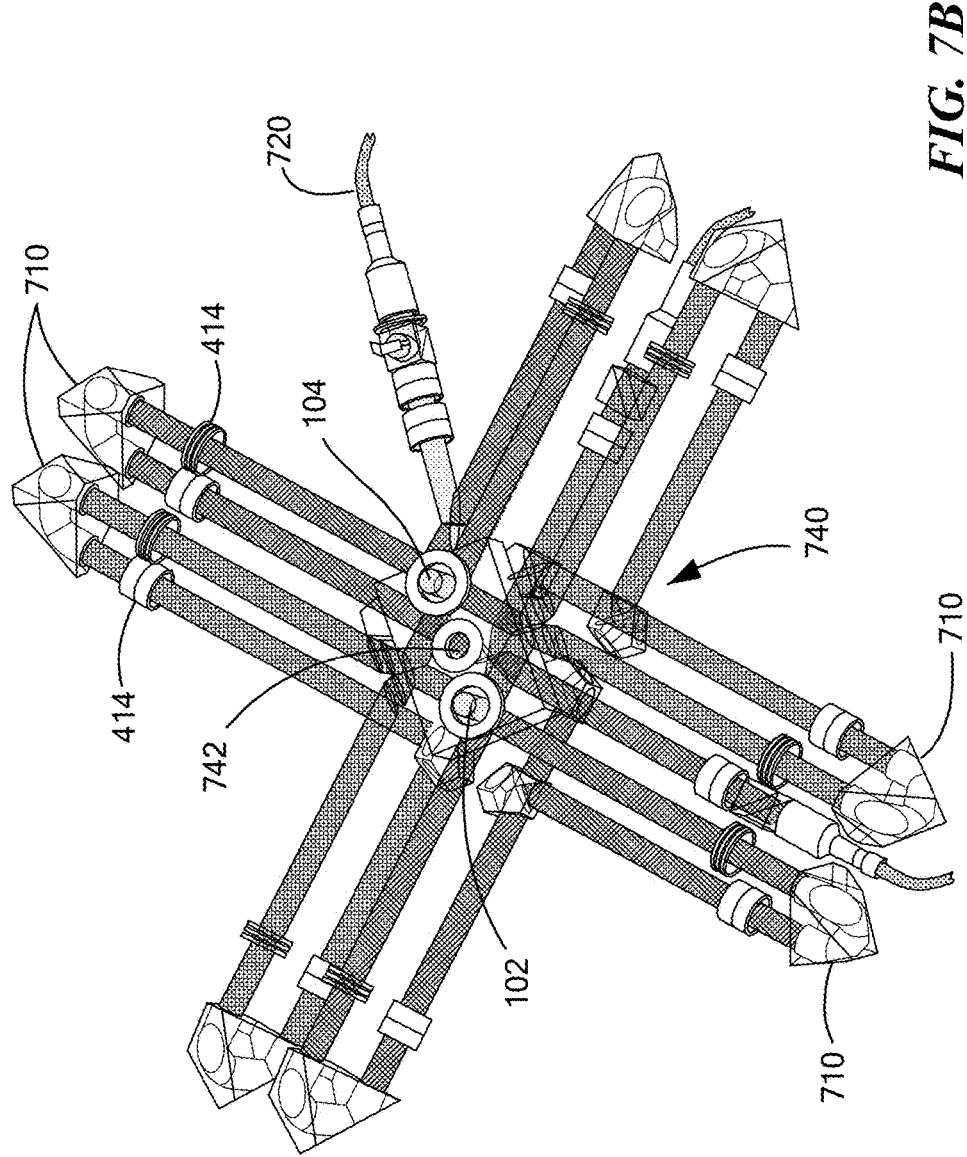

A MOT subsystem 700, depicted in FIG. 7B, provides the beams for cooling and trapping of the two MOT clouds (labelled MOT 0 and MOT 1). Top and bottom views are provided in FIGS. 7A and 8, respectively. The MOT cooling beams also perform the functions of launching the atoms between the two trapping sites and illuminating the atoms at the end of the measurement cycle for state-dependent detection. Three fibers to deliver the MOT light: one 720 for the L0 beam which is oriented perpendicular to the launch trajectory and one each (722 and 724, respectively) for L+ and L− beams (blue-detuned and red-detuned, respectively, from atomic resonance) which contribute to the launch. After the brief (several millisecond) atom recapture and trapping phase, the MOT quadrupole magnetic field coils are turned off, and the L+ and L− light frequency is detuned by several linewidths in the positive and negative direction respectively. This generates moving molasses by cooling each cloud into a moving frame. The velocity vectors of the two clouds are oriented toward one-another due to the reversal of the orientations of the L+ and L− beams between the two traps. The 45-degree orientation of the L+/L− beams from the launch direction enables this reversal by allowing the two clouds to see different sets of launch beams. After state preparation and atom interferometry but before each cloud is recaptured at the opposite trapping site, the atomic states are detected by flashing on the L0 beams (one time without repump light followed by another time with repump light for state detection normalized to total population).

The two traps require a total of 12 MOT beams incident on the cell from 12 directions (see Figure: Beam diagram through cell). As stated above, these 12 beams are delivered by three fibers for the L0, L+, and L− components respectively. The outputs of these fibers are intensity and polarization stabilized before being split into multiple beams, thus reducing non-common mode intensity fluctuations between the various beams. Because the MOT operates in a saturated regime and because the trapping locations are set by the magnetic field zero position rather than the beam positions, we are partially desensitized to fluctuations in intensity and lateral position of the MOT beams. Highly stable beam pointing directions are required, however, since launch trajectory is directly dependent on the k-vector orientations of the L+ and L− beams.

Figure 8:
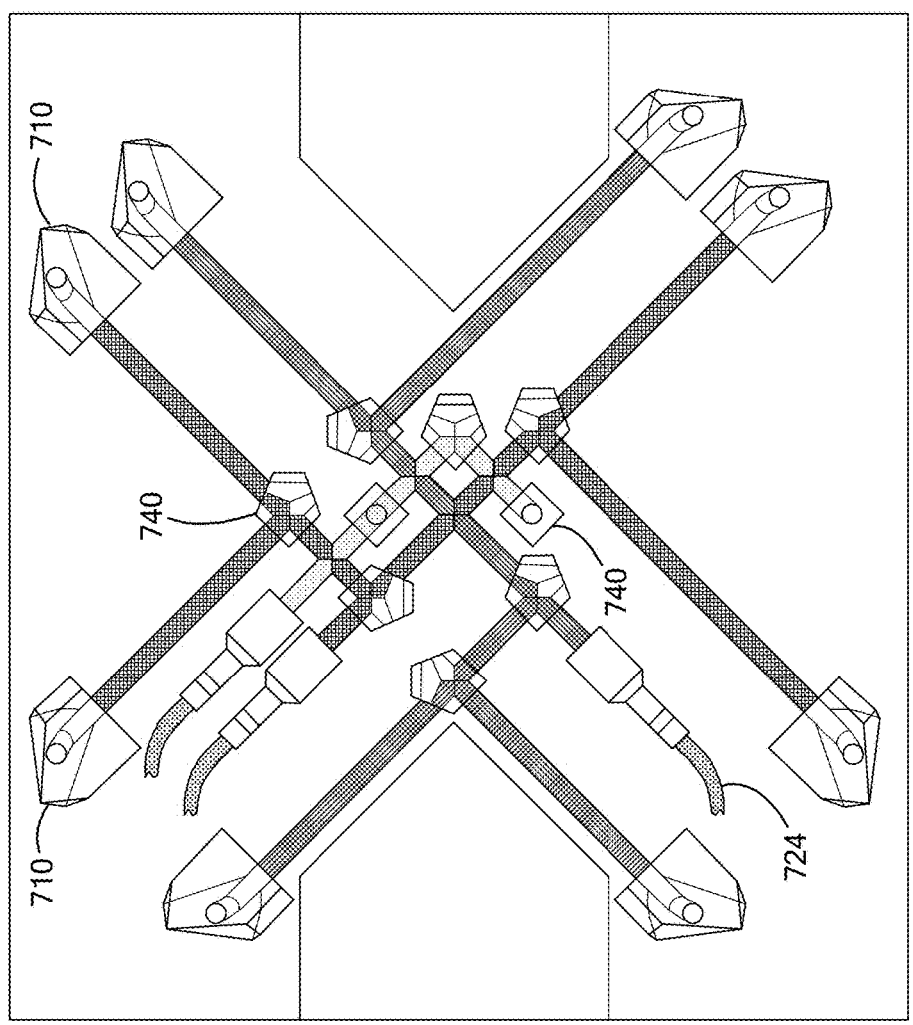
FIG. 8 shows the bottom layer of the MOT beams of a two-trap atom interferometer in accordance with the embodiment of the present invention depicted in FIGS. 7A and 7B.

One approach for splitting and routing all of these beams to the cell in a manner that is both compact and substantially reduces susceptibility of beam pointing direction to mechanical deformation of the optical baseplate 304 and mounts is shown in FIGS. 7A, 7B and 8. Only the L0 beams for MOT 0 and MOT 1 can be retro-reflected back through the cell 106 because they are never required to cool into a moving frame. These beams are split into only 2 components. The L+ and L− beams must be split into 4 components each. MOT fiber collimators 703 are confined to one side of the optical bench 304 in order to reduce susceptibility to non-common mode motions of the beams due to deformations of the bench between the fiber launch points. Similarly, all of the beamsplitters close to one-another and close to the fiber launch points near the center of the bench for this reason.

Optical routing, as described above, advantageously allows placement of the requisite MOT beam optics on a single layer of a common stable baseplate 304. Differential motions of the beam components are also mitigated by using penta-prism beamsplitters rather than single-turn beamsplitters. The two L0 beam components are directed up (out of the plane of the baseplate) and into the cell using penta prisms 740, and are retro-reflected back through the cell by mirrors with quarter wave plates. Penta prisms 740 are disposed close to the MOTs, and no further than three times the intratrap distance D relative to center 742 of the sensor 301. After the beamsplitters, the k-vectors of all 8 L+/L− components are already in their final orientations except for one final reversal by 8 corner-cube reflectors 710 that bring the beams up to the level of the cell 106. Because these corner-cubes 710 preserve the orientations of the reflected beams, they can be positioned far out on the edges of the optical baseplate 304 without regard for potential non-common mode motions in their orientation.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

We claim:

1. An improvement to measurement methods that have steps of trapping an ensemble of atoms and measuring interference fringes between populations of internal states of a quantum system based on interaction of the ensemble of atoms with a plurality of counterpropagating optical beam pairs, the improvement comprising:
   a. coupling the plurality of counterpropagating beam pairs such that each pair of beams traverses the ensemble of atoms in parallel counterpropagating beam paths;
   b. interposing a beam-splitting surface common to the plurality of counterpropagating beam pairs;
   c. generating interference fringes between reflections of the plurality of parallel pairs of counterpropagating beams to generate a detector signal; and
   d. processing the detector signal to derive at least one of relative phase and relative alignment between respective pairs of the counterpropagating beams.

2. An improvement in accordance with claim 1, wherein processing the detector signal includes inferring relative alignment of the parallel pairs of counterpropagating beams from a depth of the interference fringes.

3. An improvement in accordance with claim 1, wherein processing the detector signal includes measuring phase shear across the plurality of parallel pairs of counterpropagating beams.

4. An improvement in accordance with claim 1, wherein detecting the interference fringes includes spatially resolving the interference fringes using a detector array.

5. An improvement in accordance with claim 1, further comprising feeding back the at least one of relative phase and relative alignment between respective pairs of the counterpropagating beams to an optical element for stabilizing the at least one of relative phase and relative alignment between respective pairs of the counterpropagating beams.

6. An atom interferometer comprising:
   a. an ensemble of atoms successively launched between a pair of magneto-optical traps;
   b. a plurality of pairs of counterpropagating laser beams traversing the ensemble of atoms for probing quantum states characterizing the atoms; and c. a beam-splitting surface common to the plurality of counterpropagating beam pairs, configured to reflect a portion of each of plurality of counterpropagating beam pair;

d. a reflector for redirecting one of each pair of counterpropagating laser beams to form an interference pattern with the other of each pair of counterpropagating laser beams; and e. a detector configured to detect the interference pattern and generate a detector signal; and f. a processor for receiving the detector signal and deriving a measure of at least of relative phase and relative spatial alignment of each pair of counterpropagating laser beams.

7. An improvement to an atom interferometer having at least one distinct ensemble of atoms, the improvement comprising:

a. a single polarization-preserving fiber coupled for propagation of a first laser beam characterized by a first Raman frequency and a second laser beam characterized by a second Raman frequency distinct from the first Raman frequency, from at least one source of the first and second laser beams; and b. a first parallel displacement beamsplitter for separating the first laser beam and the second laser beam coupled out of the polarization-preserving fiber into respective free-space-propagating parallel beams each respective free-space-propagating parallel beam traversing the at least one distinct ensemble of atoms.

8. The improvement in accordance with claim 7, further comprising a reflector for turning the second laser beam into a direction antiparallel to the first laser beam.

9. The improvement in accordance with claim 8, further comprising a second parallel displacement beamsplitter for creating a plurality of counterpropagating laser beam pairs.

10. The improvement in accordance with claim 8, wherein the reflector is a corner cube reflector.

11. An atom interferometer comprising:

a. an ensemble of atoms successively launched between a pair of magneto-optical traps;

b. a first plurality of laser beams, all characterized by a first Raman frequency, traversing the ensemble of atoms in a first set of parallel directions for probing quantum states characterizing the ensemble of atoms;

c. a second plurality of laser beams, all characterized by a second Raman frequency, traversing the ensemble of atoms in a second set of parallel directions substantially counterpropagating with respect to the first set of parallel directions;

d. a first fiber collimator for coupling the first laser beam from optical fiber to free-space propagation substantially parallel to a baseplate;

e. a first parallel displacement beam splitter for splitting the first laser beam into a plurality of parallel beam paths;

f. a second fiber collimator for coupling the second laser beam from optical fiber to free-space propagation substantially parallel to the baseplate;

g. a beam-turning optic for steering the second laser beam in a path substantially parallel to the baseplate and substantially parallel to the plurality of parallel beam paths traversed by the first laser beam;

h. a reflector for turning the second laser beam into a direction substantially antiparallel to the plurality of parallel beam paths traversed by the first laser beam; and i. a second parallel displacement beam splitter for splitting the second laser beam into a plurality of parallel beam paths each counterpropagating on the plurality of parallel beam paths traversed by the first laser beam.

12. An atomic interferometer in accordance with claim 11, wherein the reflector is a corner cube reflector.

13. An improvement to an atom interferometer having a first and a second magneto-optical trap (MOT) displaced with respect to each other by an inter-trap distance bisected by a center displaced from either MOT by a "center-to-trap distance," with substantially orthogonal blue-detuned cooling beams traversing a first MOT in directions substantially opposing directions in which another pair of substantially orthogonal blue-detuned cooling beams traverse a second MOT, and substantially orthogonal red-detuned cooling beams traversing the first MOT in directions substantially opposing directions in which another pair of substantially orthogonal red-detuned cooling beams traverse the second MOT, wherein the improvement comprises:

a. a first fiber collimator for coupling a first laser beam from optical fiber to free-space propagation in a first laser direction substantially parallel to a baseplate and displaced from the center by the center-to-trap distance;

b. a second fiber collimator for coupling a second laser beam from optical fiber to free-space propagation substantially parallel to the baseplate, substantially orthogonal to the first laser direction, and also displaced from the center by the center-to-trap distance;

c. a first pentaprism, disposed entirely within a sphere of radius no greater than three times the inter-trap distance about the center, for splitting the first laser beam into two orthogonal cooling beams; and d. a second pentaprism, disposed entirely within the sphere of radius no greater than three times the inter-trap distance about the center, for splitting the second laser beam into two orthogonal cooling beams.

14. An atom interferometer in accordance with claim 12, in which the improvement further comprises:

e. a third pentaprism, disposed entirely within the sphere of radius no greater than three times the inter-trap distance about the center, for further splitting the first laser beam into two orthogonal cooling beams; and f. a fourth pentaprism, disposed entirely within the sphere of radius no greater than three times the inter-trap distance about the center, for further splitting the second laser beam into two orthogonal cooling beams.

* * * * *